(12) United States Patent
Ritter

(10) Patent No.: US 8,536,988 B2
(45) Date of Patent: Sep. 17, 2013

(54) SELF-ORGANIZING EXTENSIBLE DISTRIBUTED SENSOR ARRAY ARCHITECTURE

(75) Inventor: Scott Evan Ritter, Sudbury, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 377 days.

(21) Appl. No.: 12/887,346

(22) Filed: Sep. 21, 2010

(65) Prior Publication Data

US 2011/0285516 A1 Nov. 24, 2011

Related U.S. Application Data

(60) Provisional application No. 61/346,857, filed on May 20, 2010.

(51) Int. Cl.
*G08B 9/00* (2006.01)
(52) U.S. Cl.
USPC ...................... 340/286.02; 370/276
(58) Field of Classification Search
USPC ...................... 340/286.02; 370/276
See application file for complete search history.

(56) References Cited

U.S. PATENT DOCUMENTS

| | | | |
|---|---|---|---|
| 3,990,036 A | 11/1976 | Savit | |
| 3,996,553 A | 12/1976 | Siems et al. | |
| 4,023,140 A | 5/1977 | Siems et al. | |
| 4,092,629 A | 5/1978 | Siems et al. | |
| 4,117,448 A | 9/1978 | Siems | |
| 4,398,271 A | 8/1983 | Cretin et al. | |
| 4,509,170 A | 4/1985 | Hollinger et al. | |
| 5,058,080 A | 10/1991 | Siems et al. | |
| 5,400,298 A | 3/1995 | Hepp | |
| 6,002,339 A | 12/1999 | Norris | |
| 7,002,470 B1* | 2/2006 | Miao | 340/539.22 |
| 7,937,167 B1* | 5/2011 | Mesarina et al. | 700/78 |
| 2005/0122231 A1 | 6/2005 | Varaiya et al. | |
| 2007/0171050 A1* | 7/2007 | Westhoff et al. | 340/539.22 |
| 2008/0191868 A1* | 8/2008 | Lee et al. | 340/539.22 |
| 2010/0090823 A1* | 4/2010 | Park et al. | 340/539.1 |

* cited by examiner

*Primary Examiner* — Travis Hunnings
(74) *Attorney, Agent, or Firm* — Ropes & Gray LLP

(57) ABSTRACT

This invention relates to methods and systems for providing data from a distributed array. In one aspect, the array is a sensor array that includes sensor nodes that are each associated with one or more sensors, and the data includes sensor data acquired from the sensors by the sensor nodes. The sensor array employs modular and interchangeable sensor nodes that are capable of self-organizing in response to a network disruption while maintaining a flow of synchronized data to the event monitor. This self-organizing characteristic enables the overall network of nodes to be self-healing and easily extensible. The improved fault resilience makes it possible to deploy the sensors without requiring complex monitoring or fault diagnosis. Embodiments of the invention can be employed in any number of applications, including without limitation, tunnel activity detection, seismic/acoustic monitoring/detection and other applications where gathering sensor data may be desired.

32 Claims, 6 Drawing Sheets

SELF-ORGANIZING EXTENSIBLE DISTRIBUTED SENSOR ARRAY ARCHITECTURE

CROSS-REFERENCE TO RELATED APPLICATION

This claims the benefit of co-pending U.S. Provisional Patent Application No. 61/346,857, filed May 20, 2010, which is hereby incorporated by reference herein in its entirety.

GOVERNMENT CONTRACT

The U.S. Government has a paid-up license in this invention and the right in limited circumstances to require the patent owner to license others on reasonable terms as provided for by the terms of Contract No. W912HZ-08-C-0042 awarded by ERDC.

TECHNICAL FIELD

This invention relates to self-organizing distributed arrays and methods of operating the same, and is particularly applicable, without limitation, to sensor arrays used in tunnel activity detection, seismic/acoustic monitoring/detection and other applications where gathering sensor data may be desired.

BACKGROUND

Many applications rely on sensor networks or data acquisition or aggregation networks in order to electronically monitor events in an area. For example, sensor networks are used in tunnel activity detection systems where the networks can provide alerts about intruders, in forest fire detection systems, in battlefield observations, in seismic or acoustic monitoring/detection systems, and in other applications where gathering sensor data may be desired. Sensor networks generally include several sensors or transducers (e.g., geophones, hydrophones, heat sensors, fire detectors, motion sensors, cameras, etc) that are deployed within an environment such that data from the sensors can be received by a processing unit for analysis via a common communication channel. These sensor networks are generally unmanned and may be deployed in hostile environments where they are expected to function properly over an extended period of time without requiring complex infrastructure for maintenance. Sensors that are bulky, costly, or that require complex control or monitoring are not well-suited to such applications because of the escalating costs of maintenance.

Conventional sensor networks have several vulnerabilities. For example, some prior approaches had complex control and inter-channel skew management requirements, usually requiring that each node independently synchronizes its transmissions to individual GPS receivers and emit their data asynchronously over an Ethernet or WiFi network. In networks that employed time-multiplexing of separate data packets from each sensor node, the nodes required carefully-timed techniques that involve sequentially querying each node for its data from the data receiver to reduce collision-mediating network bandwidth requirements. In these networks, special-purpose nodes typically must be interspersed amongst data-acquisition sensor nodes to ensure proper function. This complexity adds to the cost of deployment, maintenance, and often compromises the resilience of the network.

Accordingly, sensor networks that have improved fault resilience without requiring complex monitoring or fault diagnosis are desirable. It is particularly desirable that such networks employ relatively low-cost sensor nodes and that the overall network be modular, extensible, and have low maintenance costs.

SUMMARY

This invention relates to methods and systems for providing data from a distributed array. For simplicity and ease of description, the invention is described in the specific application of providing sensor data using a sensor array. However, the systems and methods described herein can be applied to provide data from other types of nodes in a distributed network, without departing from the principles of the invention. The sensor array employs modular and interchangeable sensor nodes that are capable of self-organizing in response to a network disruption while maintaining a flow of synchronized data to the event monitor. As set forth in more detail below, this self-organizing characteristic enables the overall sensor network to be self-healing and easily extensible. The improved fault resilience makes it possible to deploy the sensors without requiring complex monitoring or fault diagnosis. Embodiments of the invention can be employed in any number of applications, including without limitation, tunnel activity detection, seismic/acoustic monitoring/detection and other applications where gathering sensor data may be desired.

In an embodiment, several sensor nodes are assembled into a sensor array. As used herein, a "sensor node" refers to an autonomous unit that samples and digitizes analog data from one or more local sensors (collectively known as a sensor cluster). The data typically relates to activity within the sensing zone of the individual sensors, and can include information about channel activity, geothermal activity, sounds, light, etc. A sensor array generally includes two or more sensor nodes communicatively coupled in a serial fashion, terminating in a master node at one end of the serial chain. The sensor nodes can be distributed over a wide region and daisy-chained together to form networks incorporating many sensors. Any node that is incrementally closer to the master node (downstream) from another (upstream) node can detect the upstream node, synchronize and aggregate its own sensor data with that of the upstream node, and emit the aggregate, synchronized data to the next node downstream. The master node receives the digitized aggregate data in a single packet emitted by the sensor node that is closest to the master node, and in turn provides the digitized information to a host node. The master node and host node can be any suitable processing units, such as general-purpose or specialized computers.

In one aspect, a method for providing sensor data from a sensor array includes generating a data packet by a terminal sensor node in response to receiving a control packet. The communication of sensor data is generally "data-driven." This means that sampling, conversion, and transmission of sensor data are triggered by the receipt of control or data packets, rather than a global network clock. To initiate transmission of sensor data, the master node emits a control packet which flows from the first sensor node to the last sensor node that is located at the most distal end of the contiguous chain. The sensor node that is located at the most distal end of the chain is referred to herein as a terminal sensor node, and plays a specialized role in the communication of the sensor data as described in more detail below. The sensor nodes sample sensor data from the local sensors for transmission in the next communication cycle in response to receiving the control packet. In other embodiments, sensor nodes trigger sampling and conversion of sensor data for transmission in a subsequent cycle in response to receiving a data packet for the current cycle. As used herein, a "packet" refers to a datagram, a frame, a message, or other definable collection of bits in a transmission. A data packet refers to a packet that includes the output of at least one sensor in a sensor node. A control packet is a packet that includes configuration information for the sensor network or one or more sensor nodes. The sampled data is transmitted in an augmented data packet that includes the sensor data of all contiguously connected sensor nodes between and including the terminal node and the sensor node transmitting the augmented packet.

In one aspect, the control packet includes an indexed slot for each node. The indexed slot for a particular node may contain node-specific configuration information for that sensor node, such as local gain adjustment or GPS coordinates for the sensor node. The control packet also includes an index counter that is incremented at each node after the node assumes the current index count as its own identification. When the terminal sensor node receives the control packet, it emits a data packet that includes the sensor data for local sensors of the terminal sensor node. The remaining non-terminal sensor nodes transmit data only in response to receiving the data packet originated by the terminal sensor node, by adding their sensor data to the received data packet. Specifically, the data packet from the terminal sensor node includes an indexed slot for each connected sensor node. Each node that receives the data packet inserts its own sensor data in the appropriate indexed slot and forwards the augmented data packet downstream in the direction of the master node. Because data packets are used to "clock" the network, the terminal sensor node emits a data packet even if it has not detected an "event", or a change in the level of monitored activity that would be considered significant by an event monitor. That is, the sensor nodes are agnostic to the specific event monitored. A benefit of agnostic nodes is that the sensor nodes themselves can be any simple detection units that are capable of communicating with nearby nodes via a relatively simple packet-passing communication scheme, without a need for a microprocessor.

The sensor nodes are modular and interchangeable, thereby enabling the sensor array to dynamically respond to and recover from network disruptions. In one aspect, if communication among the sensor nodes is disrupted, the communications protocol between the nodes informs the master node of the change to the original configuration. However, synchronized data continues to flow from those sensor nodes that remain contiguously connected to the master node. Specifically, if the daisy chain is severed, or any sensor node located within the chain otherwise become inoperative, the currently-designated terminal node is effectively severed from the master node. However, in accordance with principles of the invention, the most distal sensor node in the portion of the chain that remains continuously connected to the master node can detect this change in configuration automatically assume the role of the terminal node. In an embodiment, a sensor node automatically assumes the role of the terminal node if the sensor node detects a timeout while waiting for a data packet to arrive. Similarly, a node that is currently the terminal node will relinquish that role if it receives a data packet from a more distal node. As a result, the sensor array can be extended simply by attaching new nodes without a need for centralized reconfiguration. An advantage of this feature is added robustness when the nodes are deployed in hostile environments where they are prone to damage or network disruptions.

BRIEF DESCRIPTION OF THE DRAWINGS

The foregoing and other objects and advantages of the invention will be appreciated more fully from the following further description thereof, with reference to the accompanying drawings. These depicted embodiments are to be understood as illustrative of the invention and not as limiting in any way.

DESCRIPTION OF ILLUSTRATIVE EMBODIMENTS

To provide an overall understanding of the invention, certain illustrative embodiments will now be described, including systems and methods for providing sensor data in a self-organizing extensible distributed sensor array. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Figure 1:
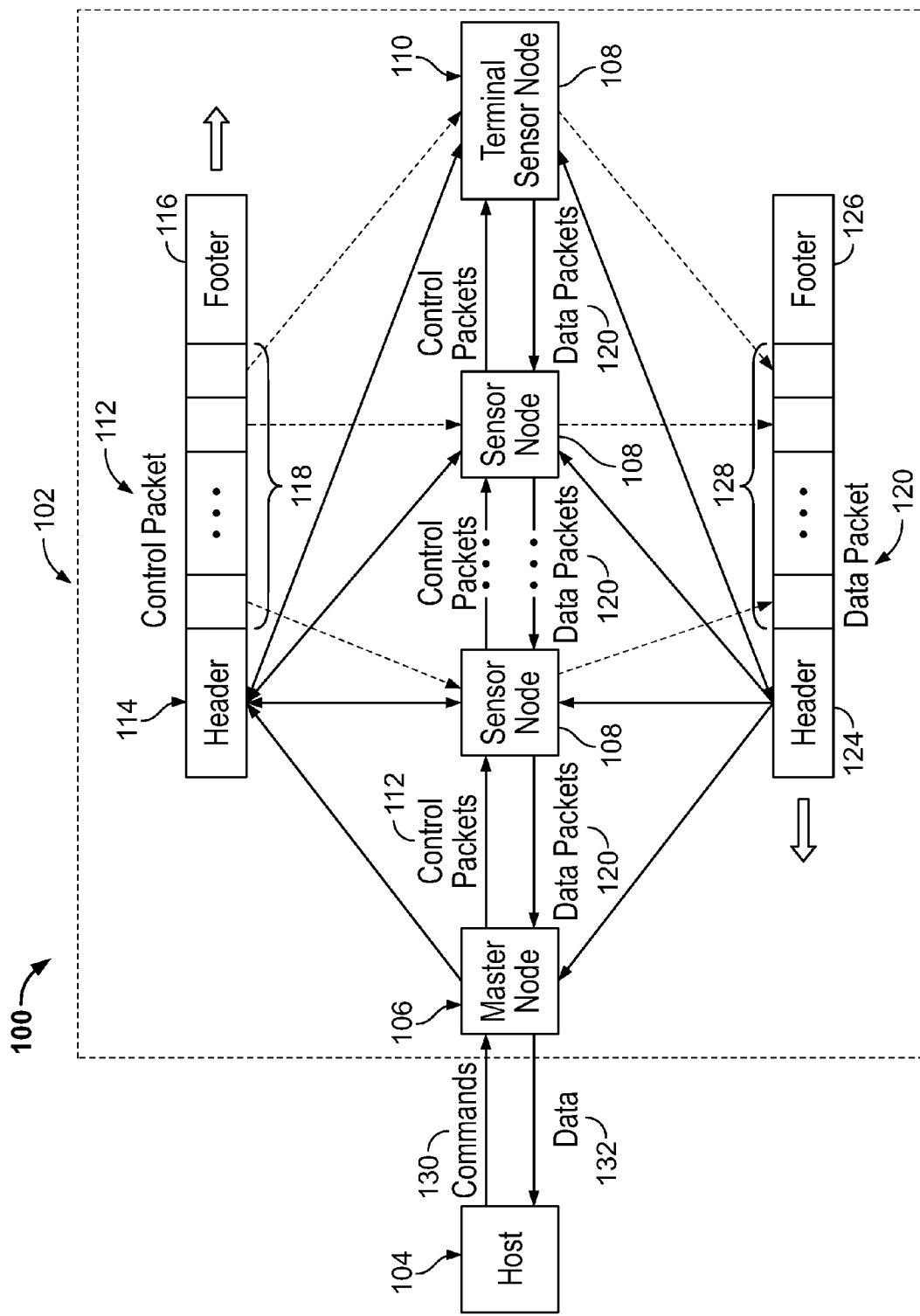
FIG. 1 is a schematic diagram of a sensor network 100 in accordance with illustrative embodiments of the invention.

FIG. 1 is a schematic diagram of a sensor network 100 in accordance with illustrative embodiments of the invention. Sensor network 100 includes a host node 104 and a sensor array 102. The host node 104 can be any suitable device having wireless or wired communication capabilities, including, without limitation, a desktop computer, a laptop computer, a personal data assistant, a mobile telephone, a portable computer, or other computing device. The host node 104 communicates with the sensor array 102 by issuing commands 130 to a master node 106, and in return, receiving aggregate sensor data 132 from the master node 106. The host node 104 can use commands 130 to instruct the master node 106 to start or stop acquiring sensor data, to provide parameter values for sensor nodes, to trigger a diagnostic mode, etc. The commands 130 are generally issued asynchronously, but can be periodic based, e.g., on a defined cycle time. The transmission channel for the commands 103 from the host node 104 to the master node 106, may, but need not be the same as the channel used for data transmissions from the master node 106 to the host node 104. In one aspect, the sensor nodes in the sensor array are coupled in a daisy-chain configuration via a full-duplex communications channel. In another aspect, the sensor nodes in the sensor array are coupled in a daisy-chain configuration via a half-duplex communications channel. While illustrative sensor network 100 includes only one host node 104, multiple host nodes 104 can be employed, e.g., to add redundancy in the event of a host node failure. Where multiple master nodes 106 are employed, a single common host node 104 can serve all the master nodes. Alternately, multiple host nodes 104 can be used. The master node 106 can be any suitable device capable of receiving commands 130 from the host node 104, transmitting control packets 112 to the sensor nodes 108, and receiving data packets 120 from the sensor nodes 108. The master node 106 is described in more detail with reference to FIG. 4. In some embodiments, in addition to relaying data from the sensor nodes to the host node 104, the master node 106 also reports updates to the host node 104, including without limitation, data packet timeouts, number of active or inactive sensor nodes, and other network status updates. The host node 104 and the master node 106 can communicate using any suitable wired or wireless communication channel. As used herein, the term "channel" refers to a path of communication between two or more points. In some embodiments, the host node 104 is attached via a trunk cable to the sensor array 102. A signal repeater and a power injector can be disposed between the master node 106 and the host node 104 if desired or necessary.

The sensor array 102 includes intermediate sensor nodes 108 and a terminal sensor node 110. The master node 106 and the sensor nodes 108 and 110 communicate by circulating control packets 112 and data packets 120. The master node 106 emits the control packets 112 at the system sample rate to the nearest one of sensor nodes 108, which propagates the control packet 112 to the terminal sensor node 110. Data packets 120 generally flow in the reverse direction, from the terminal sensor node 110 back to the master node 106. The sensor nodes 108 can be distributed over a wide region and daisy-chained together to form networks incorporating many sensors, such that any sensor node which is incrementally closer to the master node 106 than a second node can detect the second node, synchronize and aggregate its own data with that of the second node, and emit the synchronized data in the direction of the master node 106. If communication among the sensor nodes is disrupted, the communications protocol between the nodes can inform the master node of the change to the original configuration. However, as described below in more detail, the nodes can self-organize such that synchronized data continues to flow from those sensor nodes 108 that remain contiguously connected to the master node 106. The terminal sensor node 110 is generally the most distal sensor that remains contiguously connected to the master node 106. Any of the sensor nodes 108 can self-identify as the terminal sensor node in response to such a disruption if for example, the sensor node fails to receive a data packet from a more distal sensor node within a predefined period of time. Conversely, a sensor node 108 that has self-identified as a terminal node 110 can relinquish that role if the node receives a data packet from a more distal sensor node.

In one aspect, the master node 106 emits, at the system sample rate, a control packet 112 to the nearest sensor node 108 in the sensor array 102. The receipt of the control packet by a sensor node 108 triggers a sample conversion process by the sensor node 108. The sample conversion process includes signal acquisition from one or more sensors (e.g., geophones or hydrophones), analog-to-digital conversion of the acquired signal, gain adjustment, and other preprocessing that may be specified in the control or data packet header. Alternatively, the sample conversion can be triggered by a returning data packet 120 from a prior cycle. The content of the control packet 112 may provide control input to the sensor node 108, e.g., for gain adjustment or internal sample skew compensation. Generally, the sensor nodes 108 sample sensor data at time n, in response to receiving a control packet or a data packet, for transmission at a future time n+1. Suitable sampling rates can range anywhere from several hertz to several megahertz depending on the specific type of physical channel used to connect the sensor nodes, including, without limitation, its bandwidth, separation distance between nodes, and the speed of the processors used in each sensor node 108. In one illustrative embodiment, the sample rate is on the order of several kilohertz. A sensor array can include as few as two and up to and more than several hundred sensor nodes separated, in some cases, by more than 10 meters. Neighboring sensor nodes 108 may be relatively closely spaced, or spaced apart by 10 meters or more.

The propagation delay of the data and control packets are used to set timeout timers of the sensor nodes. The propagation delay for a particular sensor node is the amount of time it takes a control packet to travel from that sensor node to the terminal node or a data packet to travel from the terminal sensor node to the particular sensor node. This delay includes both the packet travel time on the medium and the execution time for processing a control packet at each intermediate node and at the terminal sensor node. The aggregate execution time of the sensor nodes is substantially deterministic because the controller module in each sensor node 108 has an execution time that is itself substantially deterministic. Such modules are well-known in the art, and include PLDs, an FPGA, a microcontroller, an ASIC, and other firmware or software. The travel time for the packets can vary with operating temperature, the voltage supply on the communication medium, and the capacitive load on the medium. In one aspect, the master node also includes a controller having deterministic timing in order to emit control packets on a periodic basis.

In a first process for determining the propagation delay for a sensor node, a delay compensation constant, d, is included in the control packet 112. In one embodiment, the delay compensation constant corresponds to the transmit time for sending a signal from one sensor node to the immediately adjacent sensor node. The propagation delay constant can be calibrated based on the nature of the channel between the sensor nodes. A particular sensor node, i, that receives the control packet determines its own propagation delay, $PD(i)$, by multiplying the delay compensation current value of the index count (i.e., the number of nodes between the sensor node and the master node). In another aspect, the propagation delay constant represents the transit time for a packet to travel from one end of the channel to the other end, without accounting for the computation time for the sensor nodes on the path. A sensor node, i, can obtain the propagation delay by multiplying its own computation delay by the current index count and adding the channel delay constant, d. The sensor node can use the $PD(i)$ value to determine an appropriate offset for the internal timeout timer of the sensor node. Using this approach, environmental effects on the propagation delay can be estimated by the host node or the master node without involvement of the sensor nodes. Alternatively, such environmental effects can be ignored if minimal. In a second process for determining the propagation delay for a sensor node, each of the sensor nodes, either continuously or while in a calibration mode, measures the round-trip time interval from the receipt of the control packet to receipt of the corresponding data packet in order to obtain a more accurate estimate of environmental and channel-length variability. In some embodiments, the nodes enter the calibration mode in response to a command from the host node or in response to a change in the configuration of the sensor array.

In one aspect, the sensor nodes maintain individual internal clocks for monitoring traffic on the network in order to trigger timeouts when disruptions occur. Typically, a timeout is triggered if a packet is not received within a predefined time period determined by the round-trip propagation delay between a sensor node and the terminal node. The timer is started when the node receives a control packet and is reset when the node receives a data packet. With unevenly spaced sensor nodes 108, the sensor network takes into account variations in propagation delays where appropriate or necessary, using the processes described above.

The control packet 112 includes a header 114, a body 118, and a footer 116. The header 114 includes an index counter that enables the sensor nodes to autonomously identify themselves. Specifically, each sensor node 108 can deduce its own individual index or network identification within the sensor array 102 based on the current value of the index-counter, e.g., by setting its identification equal to the current index. The node then increments the index before transmitting the control packet to the next sensor node. Alternatively, an index counter may be included in the data packet 120 originated by the terminal sensor node 110. The header 114 can also include a count of active sensor nodes, as well as configuration parameters, such as versioning information, for the various nodes. The configuration parameters can apply to all the nodes globally or to specific or selected sensor nodes. Additionally, where desirable, the header can include a packet sequence count so that a sensor node can determine whether it missed any prior control packets. The body 118 of the control packet 114 includes pre-allocated indexed slots for each of the sensor nodes for holding node-specific configuration data. At each sensor node 108, information located in one of the pre-allocated slots can be "consumed" by the node, and the control packet header 114 may be stripped of the control input consumed by that sensor node. Node-specific information can include, without limitation, a skew compensation value, a pre-set propagation delay to be used by the sensor node to trigger time-outs, and other general purpose input-output information as needed (e.g., a GPS positioning of the sensor node). The footer 116 includes information for error-detection and/or correction, such as a checksum value.

Similar to the control packet, the data packet 120 also includes a header 124, a body 128 having pre-allocated indexed slots for sensor data, and a footer that includes information for error detection or correction. The pre-allocated indexed slot for a sensor node can include multiple data fields, one for each sensor in the sensor cluster associated with the sensor node. The slot can also include a field that records a status for the sensor node, such as whether the node is active, inactive, fully charged, partially-charged, damaged, etc.

In one aspect, the control or data packet also serves as the sample clock responsible for initiating synchronized acquisition and digitization of sensor data at the sensor nodes 108. When the control packet 112 reaches the terminal sensor node 110 of the sensor array, the terminal sensor node 110 initiates the transmission of a data packet 120 back toward the master node. During typical operation, although any of the sensor nodes 108 can trigger sample conversion upon receipt of a control packet 112 or a data packet 120, only the terminal sensor node 110 can transmit a data packet in response to receiving a control packet. Any remaining sensor nodes 108 can only augment and forward a data packet originated by the terminal sensor node 110, unless that node has assumed the role of the terminal sensor node. Prior to transmitting or forwarding a data packet, a sensor node inserts sample data obtained from the sensor cluster associated that sensor node into an allocated slot in the received data packet based on the index or identifier of the sensor node. The sensor data transmitted in a particular time interval is the result of sample conversion performed during the immediately preceding time interval.

It is important to note that in the afore-described embodiments, there is no need for each sensor node to maintain a sample clock that is synchronized with the remaining sensor nodes because transmissions are timed by the receipt of a control or a data packet. Specifically, the receipt of a control packet (or data packet) at the sensor nodes can trigger the sensor nodes to initiate sample conversion for transmission on the returning or subsequent data packet, and also trigger the terminal node to begin transmitting sensor data. As described below, the control packet can also trigger the data countdown timer for the sensor nodes, so that a node that fails to receive a data packet within a predefined period of time after the control packet is received can take necessary action (e.g., assume the terminal sensor role) in order to maintain the flow of sensor data toward the master terminal. Similarly, the receipt of a data packet by a sensor node within the predefined period of time triggers the receiving sensor node to insert data from the local sensors and to forward the augmented data packet to the master node 106. In one aspect, in order to detect whether the sensor array has been extended by appending new nodes, the terminal node forwards the control packet on its distal communication port, whether or not a more distal node is known to exist, and only originates a data packet if it does not receive a data packet from a more distal node within a defined time interval. According to another embodiment, the terminal node forwards the control packet on its distal communication port upon receipt of the control packet and concurrently emits a data packet (i.e., it does not wait for a response), and ceases to serve as a terminal node upon receipt of a response. Alternatively, the designated terminal sensor node can send a periodic special packet on its distal communication port to detect the presence of a new terminal sensor node. Upon detecting a new terminal sensor node, the terminal node can transmit a message to the preceding nodes so that the nodes can adjust their individual timeout timers.

The sensor array of sensor network 100 improves over conventional networks in many respects. For example, because all sensor nodes (including the terminal sensor node 110) are generally interchangeable with one another, damaged sensor nodes can be easily replaced by simply replacing that particular sensor node without a need to reconfigure the network. Moreover, since the sensor nodes dynamically assume identifiers and roles, sensor data can continue to flow from the remaining contiguously connected sensor nodes to the master node in the event or node or channel failure. The sensor array can be extended trivially by simply inserting additional sensor nodes along the daisy chain. In addition, the receipt of a data or control packet by a node triggers the node to begin sampling for the next transmission and can also start the clock on when the sensor node can expect the returning data packet. As a result of this "packet-driven" sample clock, it is unnecessary for each sensor node to maintain an internal clock that is perfectly synchronized with the clocks of the other nodes in order to achieve synchronous sampling. The use of a single packet with pre-allocated slots for the transmission of aggregate sensor data from the nodes alleviates problems of packet collision on the transmission channel. The use of a single packet also simplifies processing at the host node 104 because the host node need only capture and parse one aggregate datum per sample, without a need for packet sorting. The pre-allocated slots in the control packet can be used to optionally transmit unique parameters to individual nodes, thereby allowing the master node to set varying requirements for data processing between the nodes. For example, the master node can include increased gain adjustment parameters in the indexed slot for a sensor node that is located in a high-noise zone of the monitored area without subjecting other sensor nodes not similarly located to the same requirements. Furthermore, these adjustments can be achieved even though the sensor itself is agnostic to the characteristics of the data gathered.

Figure 2A:
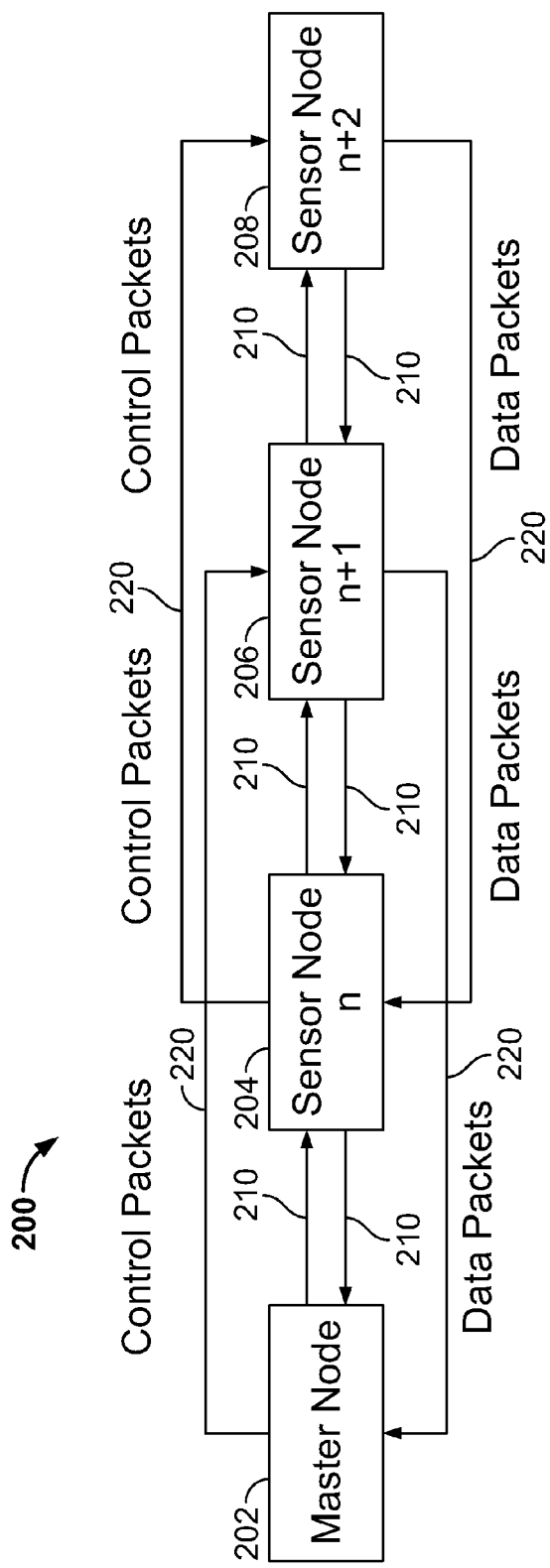
FIGS. 2A and 2B are schematic diagrams of other embodiments of a sensor network configuration that can be employed in accordance with illustrative embodiments of the invention.
Figure 2B:
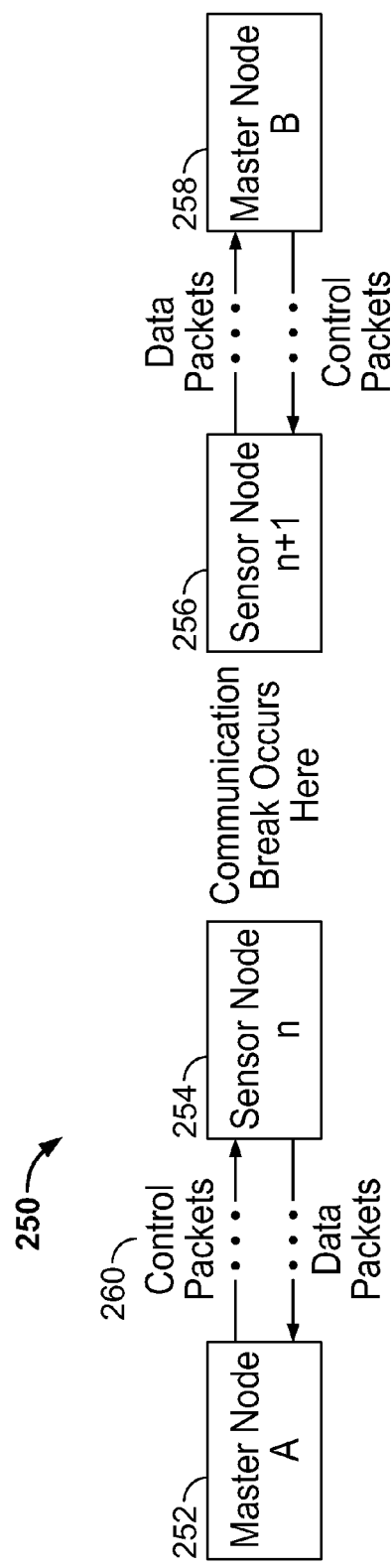

In some embodiments, where desired, the sensor array can be made more resilient by adding redundancy in the sensor network, for example, by adding redundant transmission cables (as shown in FIG. 2A) or redundant master nodes (as shown in FIG. 2B). These approaches may be combined and other suitable approaches for adding redundancy to the network can be used without departing from the principles of the invention. FIG. 2A is a schematic diagram of an illustrative sensor array 200 in which communication channel redundancy is added to allow "skipping" of damaged sensor nodes or communication cable segments. Sensor array 200 includes a master node 202 (which can be similar to master node 106 of FIG. 1) and sensor nodes 204, 206, and 208. The master node 202 and sensor nodes 204-208 are connected in a daisy-chain configuration using communication cables 210, which connect each node to its immediately preceding and the immediately subsequent node, if any. Similar to the embodiment in FIG. 1, control packets flow from the master node to the sensor nodes and data packets flow from the sensor nodes to the master node through communication cables 210. In this embodiment, the resilience of the sensor array is improved by adding redundant communication cables 220 which connects every other node, skipping a node each time. Thus, if, for example, sensor node 206 or the cable 210 between sensor node 204 and sensor node 206 fails, then sensor nodes 204 and 208 can still communicate through communication channel 220, thereby retaining connectivity from sensor node 208 to the master node 202. In some embodiments, redundant communication channels are deployed only within those segments of the sensor array that are susceptible to damage or hostile elements. Although FIG. 2A shows one primary channel and only one redundant channel, multiple redundant channels can be added as needed.

FIG. 2B is a schematic diagram of an illustrative sensor array 250 that employs multiple master nodes to improve resiliency of the sensor network. Sensor array 250 includes master nodes 252 and 258 having sensor nodes 254 and 256 communicatively coupled between the master nodes. Initially, sensor nodes 254 and 256 are communicatively coupled to each other and to the master nodes 252 and 258 in a daisy chain configuration. While so connected, control packets flow from the master node 252 to the sensor nodes, with sensor node 256 acting as the terminal node. As discussed above, data packets flow in the opposite direction, from the terminal node to the master node 252. While the master node 252 remains communicatively connected to the sensor array, master node 258 can be in a switched off state, or can be switched on but remain in a dormant or inactive state in which the master node 258 does not issue commands to the sensor nodes. If a segment in which the sensor array becomes severed from the master node 252 (e.g., due to a break in the communication channel or a damaged sensor node), the sensor nodes that are so severed can automatically reverse the direction of the control and data packets so that data packets in the severed segment now flow to master node 258, while data packets in the contiguous segment continue to flow to master node 252.

In some embodiments, the master node 258 can be designated as the new master node by an operator when the master node 252 or the host node coupled to master node 252 detects a break in the sensor array. Alternatively, the host node, which is in communication with the master nodes 252 and 258, can remotely turn on the backup master node 258 if it receives notification of a break in the network chain from the master node 252. In some embodiments, the primary master node 252 can send a signal directly to turn on the master node 258 in response to a break in the network. In some embodiments, the terminal sensor node is configured to "ping" or to send a notification signal to the backup master node 258 if the terminal sensor node does not receive a control packet from the primary master node 252 within some defined time period. Where appropriate, this multi-master configuration can be used, e.g., to reduce the roundtrip time for the control and data packets even when the nodes are otherwise contiguous. In such multi-master embodiments, the master nodes can be coupled to a the same host node, and if all the master nodes are simultaneously active, share a common clock as described below in FIG. 4.

Figure 3:
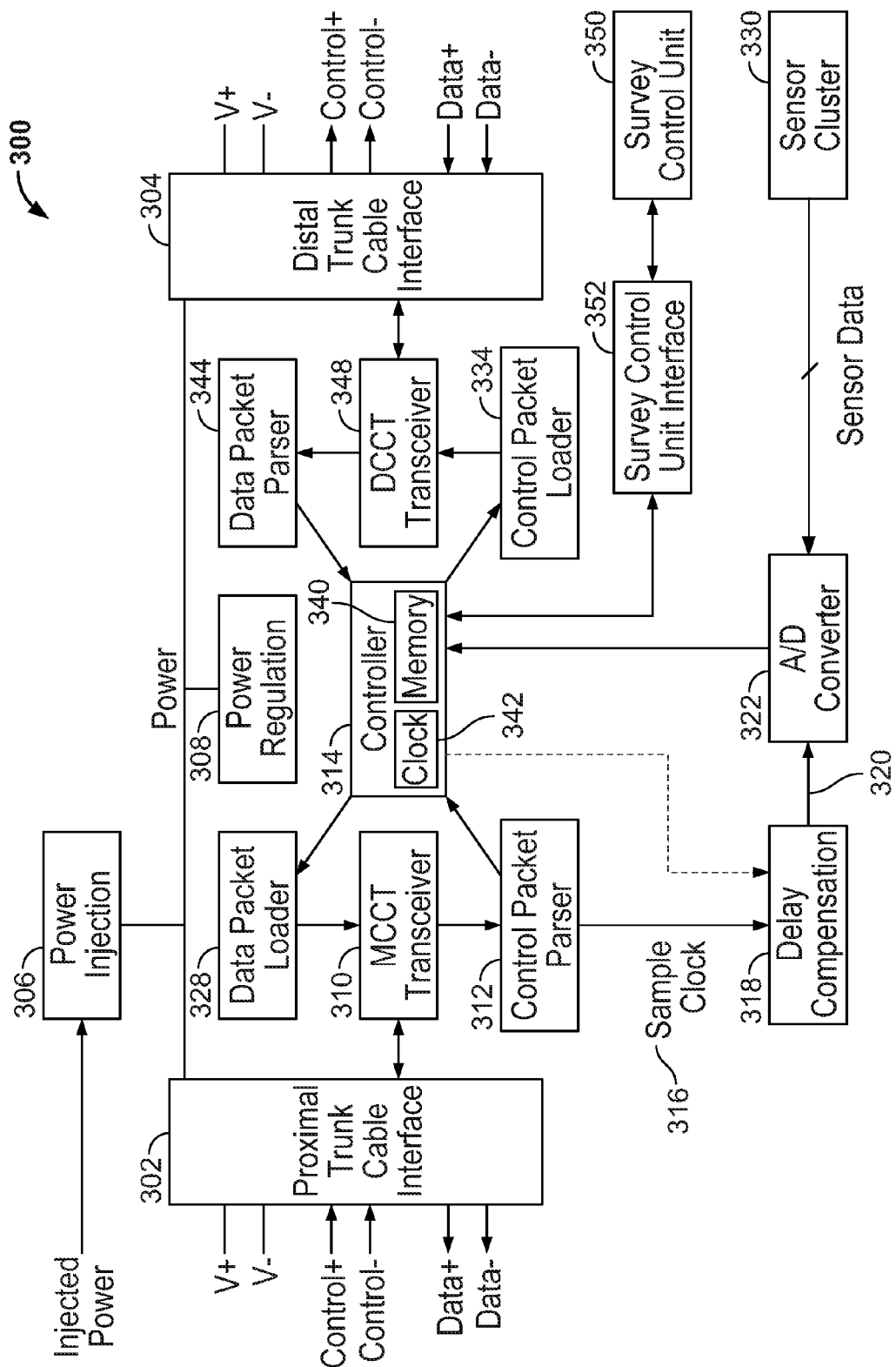
FIG. 3 is a schematic diagram of an illustrative embodiment of a sensor node that can be employed in the sensor networks of FIGS. 1, 2A, and 2B.

FIG. 3 shows a schematic diagram of an illustrative sensor node 300. As described above, a sensor array can include anywhere from two to more than several hundred sensor nodes. Sensor node 300 includes sensor cluster 330 which includes one or more sensors for collecting data in the monitored region. Sensor clusters 330 can be any suitable sensing devices, including without limitation, hydrophones, geophones, and other transducers. In a typical embodiment, a sensor cluster 300 includes two to five sensing devices. The power injection module 306 and power regulation module 308 together receive power from an external or internal power source (such as a battery) and in turn provide power to the various modules in the sensor node 300. The power injection module 306 can also provide power to other sensor nodes that share a common transmission line with sensor node 300. As used herein, a "module" includes any combination of software, hardware, firmware, or computer-readable medium storing computer executable instructions for causing a processor to carry out steps defined by those instructions.

Controller module 314 controls the operation of the various modules of sensor node 300. The controller module 314 is effectively a state machine with deterministic timing and can be implemented using PLDs, an FPGA, a microcontroller, an ASIC, other firmware, and/or software so long as the execution time can be known in a deterministic fashion. The controller module 314 includes at least memory 340 for buffering sensor data, or for storing control messages or inputs, and other configuration parameters for the sensor node 300. Memory 340 can be any suitable memory unit, and can include volatile memory, nonvolatile memory, or both. Controller module 314 also includes an internal clock 342 for monitoring the time elapsed between data or control packets in order to trigger timeout when a predefined period of time elapses after a control packet is received without receiving a data packet. The controller module can include other components as needed. In some embodiments, controller module 314 manages, among other things, (1) triggering sample conversions on data or control packet edges, (2) optionally applying skew compensation to the sample clock, (3) buffering converted sensor data or storing control parameters, (4) aggregating digitized sensor data from the data digitizers and transceivers, and (5) parsing, formatting, and transmitting the aggregate data packet. Controller module 314 can omit one or mode of these functions where necessary or desirable.

Sensor node 300 also includes proximal interface module 302 and distal interface module 304 for receiving and transmitting data and control packets. Proximal interface module 302 can be any suitable communication interface for receiving control packets originated by the master node and for transmitting data packets to the master node. Sensor node 300 also includes distal interface module 304, which can be any suitable communication interface for forwarding control packets and for receiving data packets from more distal sensor nodes. Although interface modules 302 and 304 are shown separately for ease of description, these modules can be combined in a single module without departing from the principles of the invention. In some embodiments, at the cost of added complexity (not shown here), the sensor node 300 can support additional proximal and distal attachments to both adjacent sensor nodes and sensor nodes that are two or more links away. In such embodiments, as described above in relation to FIG. 2A, if a neighboring sensor node fails or if a communication link to one of the interfaces of the sensor node fails, the sensor node can "skip" over the damaged node or damaged link and continue to provide sensor data to the master node without disruption.

Proximal interface module 302 receives control packets sent from the master node 106 (FIG. 1) at the system sample rate. As described above in connection with FIG. 1, the control packet can include pre-allocated slots for storing control inputs for individual sensor nodes. The master communication channel transceiver (MCCT) 310 receives control packets from the master node or another sensor node, and also receives data packets from data packet loader 328 for transmitting to the master node or to another sensor node. In the opposite direction, distal communication interface 304 receives data packets from nodes located further than sensor node 300 from the master node, and also transmits control packets to those nodes. The distal communication channel transceiver (DCCT) 348 receives the data packets from the distal communication interface 304 and passes on the data packets to data packet parser 344 for processing. The DCCT also receives control packets from control packet loader 334 for transmitting a more distal sensor node.

The MCCT 310 converts the control packet, if needed, into a format that can be processed by the parser 312. For example, control data that is transmitted as an optical signal can be converted into an electrical signal if such conversion is necessary to enable further processing of the control packet. The control packet parser 312 parses the converted packet and accesses the input located in a slot that corresponds to an index of the sensor node to retrieve any control messages or inputs (e.g., set gain, set delay compensation) intended for this sensor node 300. The control packet parser 312 passes any control messages or inputs for this sensor node 300 to the controller module 314. The controller module 314 provides the received control packet (which may, but need not, be stripped of control inputs for this sensor node) to the control packet loader 334 for transmission to the next sensor node in the sensor array.

In some embodiments, the control packet parser 312 also produces a sample clock signal 316 synchronized with the arrival of the control packet. The sample clock 316 propagates through a delay compensation module 318, which can be programmed by the controller 314 (as shown by the dotted arrow) to accommodate sample skew due to the multiple sensor nodes in the communication path. By so doing, the receipt of a control packet can be used independently by each sensor node in the sensor array to de-skew its local clock to automatically account for changing transmission delays in the sensor network. The compensated sample clock 320 from the delay compensation module 318 then triggers analog-to-digital converter 322 to sample sensor data from the sensor cluster 330. The analog-to-digital (A/D) converter 322 can be any suitable A/D converter, such as, for example, an N-channel A/D sigma delta converter.

If the sensor node 300 is terminal sensor node, the data from the sensor cluster 330 is placed in a new data packet and transmitted to the next sensor node in response to receiving the control packet. In some embodiments, in order to detect whether new sensor nodes have been appended to the sensor array, the terminal node forwards the received control packet on its distal communication transceiver and transmits the new data packet if it does not receive a data packet or other response within a defined time period. In a sensor array configuration with multiple master nodes (e.g., as shown in FIG. 2B), the terminal sensor node is configured to "ping" or to send a notification signal to the backup master node if the terminal sensor node does not receive a control packet from the primary master node within some defined time period. If the sensor node 300 is not a terminal sensor node, the sensor data is inserted into an appropriate slot of a received data packet by the data packet parser 344 and transmitted to the next node. Data packet parser 344 is similar to, and can be the same module as, control packet parser 312. Moreover, if the sensor node is not a terminal sensor node, detecting a timeout while waiting to receive a data packet causes the controller module 314 to assume that sensor node 300 is the most distal sensor node in the sensor array, and to take on a corresponding role of initiating data packets without first waiting for a data packet to arrive from another sensor node. This provides "self-healing" capability in sensor array.

The survey control unit 350 is an external device that can be employed to write geo-location data to the sensor nodes, e.g., at the time of installation. The survey control unit 350 can also be employed to query the sensor nodes from time to time in order to determine inactive sensors. The survey control unit 350 communicates with the sensor node 300 via survey control interface 352, which can be any suitable communication interface (e.g., an RS232 port).

Figure 4:
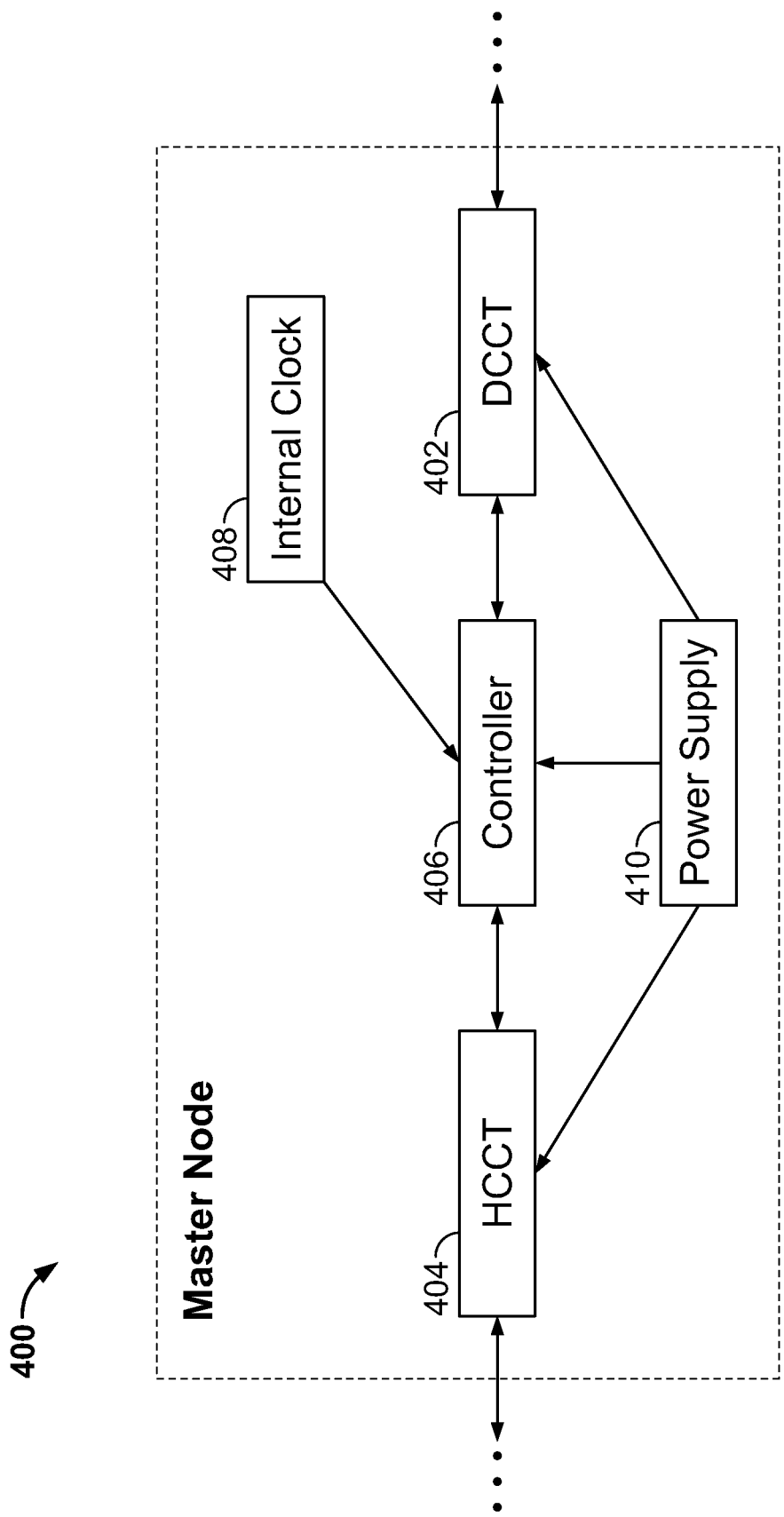
FIG. 4 is a schematic diagram of an illustrative master node in accordance with illustrative embodiments of the invention.

FIG. 4 shows a schematic diagram of an illustrative master node 400 in accordance with embodiments of the invention. In a sensor network, the node that serves as the master node can be designated by an operator or automatically by connecting the node to a host node. Physically, the master node differs from the other sensor nodes in that, unlike the sensor nodes, the master node need not include sensors. The master node will generally, though not necessarily, be located in close proximity to the host node. In a typical sensor array, the master node controls the sampling rate of the sensor nodes in the sensor by originating control packets that trigger sampling at the sensor nodes, and relays the aggregate sensor data from the sensor nodes to the host node. The master node can be any suitable computing device having wired and/or wireless communication capabilities. In some embodiments, the master node 400 includes, without limitation, a DCCT module 402, a host communications channel transceiver (HCCT) 404, controller module 406, and internal clock 408 which can be included in controller module 406. The master node 400 also includes a power supply 410 that supplies power to the various components. The DCCT module 402 receives the aggregate data packet from the nearest sensor node in the sensor array and also transmits to the sensor node control packets originated by the master node. The DCCT 402 can be similar to DCCT 348 of sensor node 300 of FIG. 3. The HCCT module 404 receives commands from the host node and provides network status updates, aggregate sensor data packets, and other suitable communication parameters to the host node.

The controller module 406 can be implemented using PLDs, an FPGA, a microcontroller, an ASIC, other firmware, and/or software. The controller module 406 includes at least a memory unit (not shown) for buffering sensor data, or for storing control messages or inputs, and other configuration parameters for the sensor network. The memory unit can be any suitable memory unit, and can include volatile memory, nonvolatile memory, or both. The controller module 406 also controls an internal clock 408 for monitoring the time elapsed between origination of the control packet and receipt of the returning data packet by the master node. The internal clock also generates the sample clock for transmitting control packets. The controller module can include other components as needed.

Figure 5:
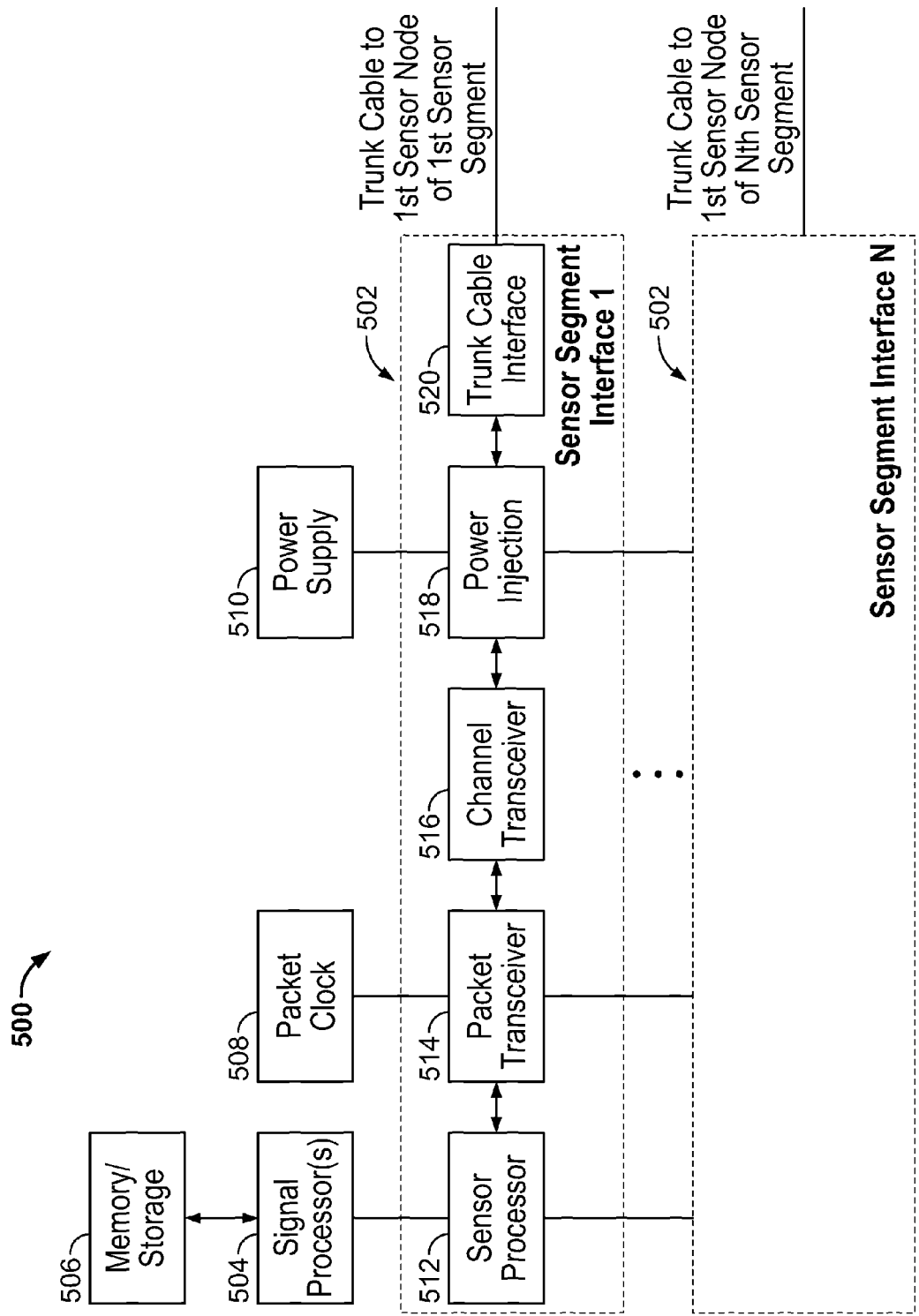
FIG. 5 is a schematic diagram of a host node architecture in accordance with an illustrative embodiment of the invention.

FIG. 5 is a schematic diagram of an illustrative host node 500 in accordance with embodiments of the invention. Host node 500 includes sensor segment interfaces 502 in communication with sensor nodes, signal processors 504, a packet clock 508, a power supply 510, and a memory unit 506. Although this embodiment of host node 500 includes one each of the signal processors 504, the packet clock 508, the power supply 510, and the memory unit 506, other embodiments can include more than one of some or all of these components without deviating from the principles of the invention. Additionally, certain components can be omitted if not necessary to the proper operation of host node 500. Host node 500 typically issues commands to the master node of each of the sensor segments 502, and in turn, receives data aggregated over the sensor nodes in the segments. The format of the command and data exchange between the master nodes and the host node 500 can differ from the format of control and data packets between the master nodes and the sensor nodes.

Sensor segment interfaces 502 can include one or more interfaces for communicating with segments of sensor nodes. A segment of sensor nodes includes one more sensor nodes. The length of each segment and the number of sensor nodes per segment, are determined by a number of factors, including, without limitation, the physical constraints or specific application sensor array, the available channel transceiver communication bandwidth, the data format, the packet processing bandwidth of the sensor and master nodes, and the data processing bandwidth of the host. A sensor segment 502 includes a sensor processor 512, a packet transceiver 514, a channel transceiver 516, a power injection unit 518, and a trunk cable interface 520. In this embodiments, multiple sensor segment interfaces 502 share a common packet clock 508 and a common signal processor 504. However, other configurations are possible. The sensor processor 512 serves incoming sensor node packets to one or more signal processors 504 of the host node. The signal processor 504 can be communicatively coupled to sensor processor 512 via any suitable medium, such as for example, an Ethernet cable. Where applicable, the sensor processor 512 also provides a control interface for sending configuration packets to the sensor nodes. The signal processor(s) 506 can store data and other configuration information in memory module 506, which can be any combination of volatile, nonvolatile, removable, or fixed memory units.

Within a sensor node segment 502, a trunk cable from each sensor segment interface 502 connects the sensor segment interface (via trunk cable interface 520) to the first sensor node of a respective sensor node segment. Each sensor node segment includes a master node, one or more intermediate sensor nodes, and a terminal sensor node. The master nodes of the various sensor node segments can be coupled to a common host node. Alternatively, several host nodes can be employed in configuration that enables the host nodes to aggregate data from the sensor array. The first sensor node is typically the sensor node in the sensor segment that is located nearest to the host node or the master node. The power supply 510 within the host node 500 can be used to provide power to the sensor nodes. In this illustrative embodiment, power injection module 518 provides power from the power supply 510 to the trunk cable interface 520, which in turn injects the power received through power injection module 518 into the sensor nodes in the sensor segment. The power can be used directly to power the sensor nodes or indirectly to charge or recharge batteries within the sensor nodes. The packet transceiver 514 parses incoming packets and, where applicable, formats outgoing packets. The packet transceiver 514 also integrates a common packet clock 508, which is used by all sensor nodes coupled to the host node to trigger synchronous (or fixed-skew) sensor data sampling. The channel transceiver 516 can be any suitable medium for passing sensor node data packets or control packets between the packet transceiver 514 and trunk cable interface 520. The channel transceiver 516 can be implemented using LVDS (low voltage differential signaling) over, e.g., CAT7 Ethernet cable or other suitable medium.

Figure 6:
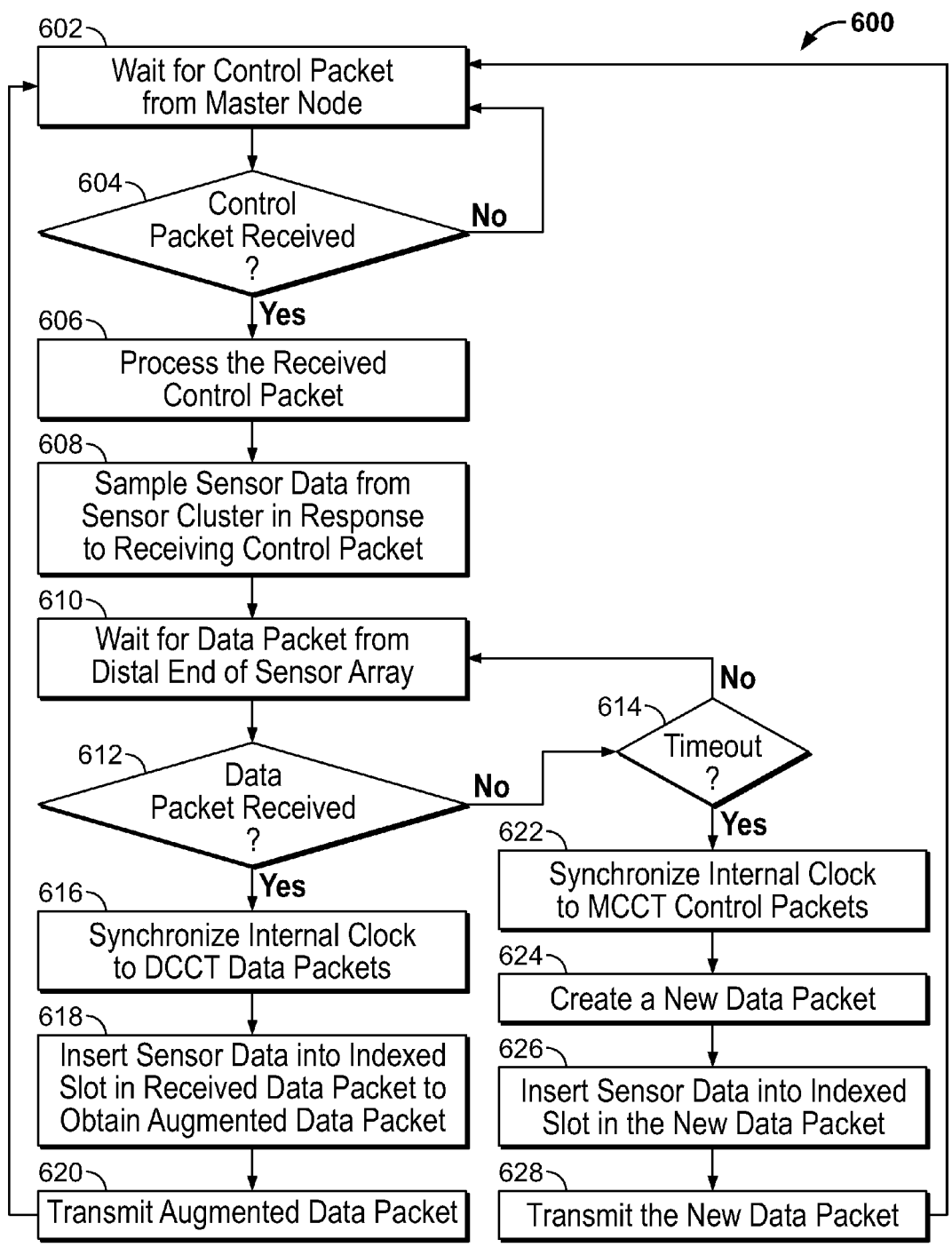
FIG. 6 is an illustrative flow diagram of a process for providing sensor data in accordance with illustrative embodiments of the invention.

FIG. 6 is an illustrative flow diagram of a process 600 for providing sensor data in accordance with illustrative embodiments of the invention. At step 602, the sensor node 108 waits for a control packet from a master node 106. At step 604 a determination is made whether a control packet is received. If no control packet is received, the process returns to step 602. Otherwise, if a control packet is received, the process continues to step 606. At step 606, the sensor node 108 processes the received control packet. Processing of the control packet includes "stripping" or "consuming" configuration information in the control packet located at an index that corresponds to the identifier of the receiving sensor node 108. The processing at step 606 also includes incrementing the index counter, and forwarding the control packet to the next sensor node 108 in the sensor array 100. At step 608, the sensor node triggers a sampling and conversion of new sensor data from the associated sensor cluster in response to receiving the control packet. In other embodiments, the sensor node 108 triggers conversion of new sensor data for the next transmission cycle in response to receiving a data packet for the current cycle.

As noted above, the sensor arrays are synchronized by the data and control packet edges, rather than a global clock. At step 610, the sensor node waits for a data packet in order to transmit the newly sampled sensor data. If the sensor node 108 is a terminal node, then the sensor node would transmit the newly sampled data on the control packet edge rather than waiting for a data packet. For ease of description, it is assumed that the sensor node running process 600 is initially an intermediate sensor node and not a terminal node. At step 612, control logic in the sensor node 108 makes a determination whether a data packet is received. If a data packet is not received, sensor node 108 detects whether a timeout has occurred at step 614. A timeout occurs if the sensor node does not receive data packet within a predefined time period, typically corresponding to the propagation delay between the sensor node and the terminal node that originates the data packet. Otherwise, if a data packet is received without a timeout, the sensor node 108 synchronizes its internal clock to the distal communications channel transceiver at step 616, so that timeout is triggered relative to data packets rather than control packets. At step 618, the sensor node 108 inserts the sensor data sampled and converted at step 618 into an indexed slot in the received data packet to obtain an augmented packet. Thus, data from all sensor nodes coupled to the same master node are collected in a single data packet with an indexed slot for each sensor node. This avoids the need for the master node to sort multiple packets, and avoids collisions on the transmission channel. At step 620, the sensor node 108 transmits the augmented packet to the next sensor node that is located proximal to the master node.

Returning to step 614, if a timeout occurs, the sensor node detects a change in the network configuration and automatically assumes the role of the terminal sensor node. As the terminal sensor node, the sensor node need not wait for a data packet in order to transmit its own sensor data. Thus, at step 622, the sensor node 108 synchronizes its internal clock to the master communications channel transceiver (MCCT) control packet edge. At step 624, the sensor node 108 creates a new data packet that includes an indexed data slot for the terminal sensor node, as well as an indexed slot for each sensor node that is coupled between the newly-designated terminal sensor node and the master node. Because nodes are indexed sequentially from the master node, the newly-designated terminal node can deduce the total number of contiguous nodes simply by reference to its own index number. At step 626, the sensor node inserts the sensor data sampled at step 608 into the new packet and transmits the packet at step 628. The process returns to 602 where the node waits for a control packet from the master node.

In practice, one or more steps shown in process 600 may be combined with other steps, performed in any suitable order, performed in parallel (e.g., simultaneously or substantially simultaneously) or removed.

Embodiments can be employed in any number of applications, including without limitation, tunnel activity detection, seismic/acoustic monitoring/detection and other applications where gathering sensor data may be desired.

The invention may be embodied in other specific forms without departing from the spirit or essential characteristics thereof. The foregoing embodiments are therefore to be considered in all respects illustrative, rather than limiting of the invention.

What is claimed is:

1. A sensor array comprising:
    a master node;
    a first sensor node configured to transmit a data packet including first sensor data from a first sensor cluster associated with the first sensor node; and
    a second sensor node located between the master node and the first sensor node, the second sensor node configured to:
    (a) sample second sensor data from a second sensor cluster associated with the second sensor node,
    (b) receive the data packet from the first sensor node,
    (c) augment the data packet with the second sensor data to obtain an augmented data packet, and
    (d) transmit the augmented data packet to the master node or to a third sensor node located in closer proximity to the master node than the first and second sensor nodes.

2. The sensor array of claim 1 wherein the first sensor node is a terminal sensor node that is configured to transmit the data packet in response to receiving a control packet originated by the master node.

3. The sensor array of claim 2, wherein the second sensor node is configured to dynamically assume a role as the terminal sensor node in the sensor array if the second sensor node detects a time-out while waiting for the data packet from the first sensor node.

4. The sensor array of claim 2, wherein the first sensor node is configured to dynamically relinquish the role of the terminal sensor node if the first sensor node receives a data packet from any other sensor node.

5. The sensor array of claim 1, wherein the master node, the first sensor node, and the second sensor node are coupled in a daisy-chain configuration via a full-duplex communications channel.

6. The sensor array of claim 5, wherein the full-duplex communication channel comprises a single wired communication channel for transmitting (1) control packets from the master node and (2) data packets to the master node.

7. The sensor array of claim 1, wherein the master node, the first sensor node, and the second sensor node are coupled in a daisy-chain configuration via a half-duplex communications channel.

8. The sensor array of claim 1, wherein sampling the second sensor data comprises initiating sampling of the second sensor data in response to receiving a prior control packet.

9. The sensor array of claim 1, wherein sampling the second sensor data comprises initiating sampling of the second sensor data in response to receiving a prior data packet.

10. The sensor array of claim 1, wherein the first sensor node is configured to transmit the data packet only in response to receiving the control packet.

11. The sensor array of claim 1, wherein augmenting the data packet comprises inserting the second sensor data in the data packet at an offset location that corresponds to an indexed location of the second sensor node in the sensor array.

12. The sensor array of claim 1, wherein the second sensor node is configured to autonomously assign an identifier for the second sensor node by incrementing a counter included in a control packet originated by the master node.

13. The sensor array of claim 1, wherein the master node is in communication with a host processor, the master node being configured to receive commands from the host processor and to provide data from the augmented data packet to the host processor.

14. An array of nodes in a network, the array comprising:
    a terminal node configured to transmit data in a first data packet only in response to receiving a control packet; and
    a first node configured to transmit data in a second data packet in response to receiving the first data packet originated by the terminal node,
    wherein the first node is further configured to automatically detect that the terminal node is severed from the network and to automatically assume a role of the terminal node.

15. The array of claim 14, wherein the nodes comprise sensor nodes and the data comprise sensor data acquired by the sensor nodes.

16. The array of claim 14, wherein the second data packet includes at least a portion of data received in the first data packet.

17. The array of claim 14, wherein the terminal node is configured to automatically relinquish the role of the terminal node in response to detecting that another distal node has assumed the role of the terminal node.

18. The array of claim 17, wherein detecting that another distal node has assumed the role of the terminal node comprises transmitting a control packet on a distal communication port of the terminal node and receiving a data packet in response to the control packet.

19. The array of claim 14, wherein the first node is configured to automatically detect that the terminal node is severed from the network in response to detecting a time-out while waiting for a data packet.

20. A node comprising a processor configured to:
prepare, in response to receiving a first data packet or a first control packet, data for transmission during a subsequent cycle;
generate an augmented data packet that includes the data for transmission and data from a second data packet if the second data packet is received at the node within a predefined time period;
generate a new data packet that includes the data for transmission if the second data packet is not received within the predefined time period; and
transmit the augmented data packet or the new data packet during the subsequent cycle.

21. The node of claim 20, wherein the node comprises a sensor node and the data for transmission comprises sensor data.

22. The node of claim 20, wherein the second data packet comprises a plurality of indexed slots, each corresponding to a unique node, and wherein generating the augmented data packet comprises inserting the data for transmission into a corresponding indexed slot for the node.

23. The node of claim 20, wherein the predefined time period is determined by an internal clock counter in the node using an interval between prior control or data packets received by the node.

24. The node of claim 20, further comprising:
one or more sensors configured to provide the data for transmission;
an internal clock for generating a sample clock for transmitting the data for transmission; and
control logic for monitoring the timing between data packets.

25. The node of claim 24, wherein the node is located in an array of nodes, and wherein the control logic causes the node to designate itself as a terminal node in the array if the second data packet is not received by the node within the predefined period of time.

26. The node of claim 24, comprising:
a master communications channel transceiver MCCT configured to receive control packets and transmit data packets comprising the data for transmission; and
a distal communications channel transceiver DCCT configured to transmit control packets and receive data packets;
wherein the control logic is configured to trigger conversions on MCCT or DCCT packet edges.

27. A method of providing data using an array of nodes, the method comprising:
sampling the data by a node in the array in response to receiving a first control packet or a first data packet; and
transmitting an augmented data packet in response to receiving a second data packet, wherein the augmented data packet includes data received in the second data packet and the data sampled by the node.

28. The method of claim 27, wherein the node is a sensor node and the data is sensor data acquired from one or more sensors associated with the sensor node.

29. The method of claim 27, further comprising transmitting the control packet by a master node in the array.

30. The method of claim 27, further comprising
generating the first or the second data packet by a terminal node in the array; and
transmitting the first or the second data packet by the terminal node in response to receiving the first control packet.

31. The method of claim 27, further comprising
monitoring the timing interval between the first data packet or control packet, and the second data packet; and
auto-designating the node as a terminal node in the array if the second data packet is not received by the node within a predefined period of time.

32. The method of claim 27, wherein the augmented data packet comprises:
a plurality of indexed slots, each corresponding to a unique node in the array, the method further comprising generating the augmented data packet by inserting the data for the node into the corresponding indexed slot.

* * * * *